United States Patent
Park et al.

(10) Patent No.: US 10,005,039 B2
(45) Date of Patent: Jun. 26, 2018

(54) SYSTEM FOR CLEANING MEMBRANE, AND METHOD FOR CLEANING MEMBRANE USING SAME

(71) Applicant: CHEIL INDUSTRIES INC., Gyeongsangbuk-do (KR)

(72) Inventors: Pyung Kyu Park, Uiwang-si (KR); Tai Kwang Yoon, Uiwang-si (KR); Jae Seok Jo, Uiwang-si (KR); Gyu Hong Min, Uiwang-si (KR); Jong Sang Park, Uiwang-si (KR); Byung Kook Hwang, Uiwang-si (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 332 days.

(21) Appl. No.: 14/649,539

(22) PCT Filed: Aug. 30, 2013

(86) PCT No.: PCT/KR2013/007835
§ 371 (c)(1),
(2) Date: Jun. 3, 2015

(87) PCT Pub. No.: WO2014/088190
PCT Pub. Date: Jun. 12, 2014

(65) Prior Publication Data
US 2015/0306544 A1  Oct. 29, 2015

(30) Foreign Application Priority Data
Dec. 3, 2012 (KR) .......... 10-2012-0139194

(51) Int. Cl.
*B01D 65/02* (2006.01)
*C02F 1/44* (2006.01)
(Continued)

(52) U.S. Cl.
CPC ............. *B01D 65/02* (2013.01); *B01D 61/22* (2013.01); *C02F 1/001* (2013.01); *C02F 1/44* (2013.01);
(Continued)

(58) Field of Classification Search
CPC .... B01D 65/02; B01D 61/22; B01D 2315/06; B01D 2315/20; B01D 2321/04;
(Continued)

(56) References Cited

U.S. PATENT DOCUMENTS

| | | | |
|---|---|---|---|
| 5,647,988 A * | 7/1997 | Kawanishi | B01D 29/114 210/321.69 |
| 2005/0258098 A1 | 11/2005 | Vincent et al. | |
| 2007/0039888 A1 * | 2/2007 | Ginzburg | B01D 61/18 210/650 |

FOREIGN PATENT DOCUMENTS

| | | |
|---|---|---|
| CN | 102481521 A | 5/2012 |
| JP | 2007-296500 | 11/2007 |

(Continued)

OTHER PUBLICATIONS

International Search Report and Written Opinion for Corresponding PCT Application No. PCT/KR2013/007835, dated Nov. 18, 2013 (15 pages).

(Continued)

*Primary Examiner* — David C Mellon
(74) *Attorney, Agent, or Firm* — Lewis Roca Rothgerber Christie LLP

(57) ABSTRACT

A system for cleaning a membrane of the present invention includes: a first membrane filtration tank which includes a membrane and an aerator, filters inflow raw water by membrane filtration, and discharges treated water and water to be treated, respectively; a pressure gauge for measuring a transmembrane pressure and a flow meter for measuring a (Continued)

permeation flux which are provided at a treated water discharge line of the first membrane filtration tank; and a controller which calculates a water permeability recovery rate by calculating the water permeability from the differential pressure measured at the pressure gauge and the permeation flux measured at the flow meter, predicts a membrane contamination degree from the calculated water permeability recovery rate, and controls a back-pulsing interval and an intermittent aeration interval.

7 Claims, 4 Drawing Sheets

(51) Int. Cl.
*B01D 61/22* (2006.01)
*C02F 1/00* (2006.01)
*C02F 3/12* (2006.01)

(52) U.S. Cl.
CPC ........ *C02F 3/1268* (2013.01); *B01D 2315/20* (2013.01); *B01D 2321/04* (2013.01); *C02F 2209/03* (2013.01); *C02F 2209/22* (2013.01); *C02F 2209/40* (2013.01); *C02F 2303/16* (2013.01); *Y02W 10/15* (2015.05)

(58) Field of Classification Search
CPC .......... B01D 2321/18; B01D 2321/185; B01D 2321/2066; B01D 2321/40; C02F 3/1268; C02F 1/001; C02F 1/44; C02F 2303/16; C02F 2209/03; C02F 2209/40; C02F 2209/22; Y02W 10/15

See application file for complete search history.

(56) References Cited

FOREIGN PATENT DOCUMENTS

| | | |
|---|---|---|
| JP | 2008-289959 | 12/2008 |
| KR | 10-2009-0062503 | 6/2009 |
| KR | 10-2011-0068727 | 6/2011 |
| KR | 10-2011-0068817 | 6/2011 |
| WO | WO 2007/006153 A1 | 1/2007 |
| WO | WO 2008/132186 A1 | 11/2008 |
| WO | WO 2010/109265 A1 | 9/2010 |

OTHER PUBLICATIONS

Office Action dated Mar. 4, 2016 in corresponding Chinese Patent Application No. 201380072177.6 (6 pgs.).

Remize, et al., "*Evaluation of backwash efficiency, definition of remaining fouling and characterisation of its contribution in irreversible fouling: Case of drinking water production by air-assisted ultra-filtration*", Journal of Membrane Science, vol. 355, 2010, pp. 104-111.

Extended European Search Report for corresponding EP Application No. 13860833.6, dated Jul. 20, 2016 (7 sheets).

* cited by examiner

SYSTEM FOR CLEANING MEMBRANE, AND METHOD FOR CLEANING MEMBRANE USING SAME

CROSS-REFERENCE TO RELATED APPLICATIONS

This application is a National Phase patent application and claims priority to and the benefit of International Application Number PCT/KR2013/007835, filed on Aug. 30, 2013, which claims priority to Korean Patent Application Number 10-2012-0139194, filed on Dec. 3, 2012, the entire contents of all of which are incorporated herein by reference.

TECHNICAL FIELD

The present invention relates to a membrane cleaning system and a method for cleaning a membrane using the same. More particularly, the present invention relates to a membrane cleaning system which is used in a submerged membrane water treatment process and monitors a degree of membrane contamination to optimize time for cleaning a membrane through back-pulsing and air cleaning, thereby minimizing consumption of treated water for back-pulsing and energy consumption required for aeration, and a method for cleaning a membrane using the same.

BACKGROUND ART

A membrane refers to a porous physical barrier which allows a specific component in a multi-component mixture to be selectively passed therethrough, thereby separating components of the mixture. Advantageously, water treatment using a membrane requires less chemicals such as coagulants than other filtration processes and allows reduction of required installation space. A membrane for water treatment can separate organic pollutants, inorganic pollutants, and microorganisms in water depending upon the kind thereof. Pressure-driven membrane are divided into a micro-filtration (MF) membrane, an ultrafiltration (UF) membrane, a nano-filtration (NF) membrane, a reverse osmosis (RO) membrane, and the like according to pore size. In addition, membranes are also divided into a polymer organic membrane and an inorganic membrane of ceramics or metals. Examples of a membrane module (or film module), which has a membrane disposed in a housing and configured to perform solid-liquid separation, include tubular, hollow fiber, spiral wound, plate and frame, and rotary disk membrane modules.

Such a membrane has innumerable fine holes, i.e. membrane pores. Thus, pollutants contained in raw water are accumulated on a surface of the membrane, or adhere to the surface of the membrane or an inner side of the pores when filtered out by the membrane or passed through the membrane, thereby causing contamination of the membrane. When the membrane is contaminated, the membrane is covered with accumulated pollutants, or the membrane pores are reduced or plugged during filtration, thereby causing deterioration in raw water permeability and performance of the membrane, and thus periodic membrane cleaning is performed during filtration in order to recover performance of the membrane.

A method for cleaning a membrane may be divided into physical cleaning and chemical cleaning. Typical examples of physical cleaning are back-pulsing using water and aeration using air. Back-pulsing is a process wherein treated water is pushed in a direction opposite to a filtration direction to pass through a membrane, thereby removing materials accumulated on a surface of the membrane or in membrane pores. Aeration is a process wherein air is blown to the surface of the membrane to remove accumulated pollutants.

As an air cleaning method for a submerged membrane typically used in a water treatment apparatus, cyclic aeration and automatic aeration filtration (AAF) are widely known in the art. Such conventional methods were developed to minimize membrane contamination and increase energy efficiency. However, cyclic aeration has a disadvantage of exhibiting poor efficiency under raw water conditions of severe variation in water quality. On the other hand, AAF is an air cleaning method wherein change in aeration method and adjustment of aeration intensity are achieved based on turbidity of membrane inflow water and membrane contamination index, and can thus cope with variation in quality of raw water and can be associated with automatic control. However, AAF has a disadvantage in that optimum aeration intensity equation for the membrane contamination index must be derived again when the water system of inflow raw water is changed.

Technical Problem

It is one aspect of the present invention to provide a membrane cleaning system which can clean a membrane in a more efficient and economical manner by taking into account contamination characteristics of the membrane, and a method for cleaning a membrane using the same.

It is another aspect of the present invention to provide a membrane cleaning system which can clean a membrane in a timely manner through back-pulsing and air cleaning based on a predicted degree of membrane contamination regardless of seasonal variation in quality of raw water, and a method for cleaning a membrane using the same.

It is a further aspect of the present invention to provide a membrane cleaning system which can automatically adjust an interval of physical cleaning (back-pulsing using treated water and aeration or air cleaning using air), thereby minimizing consumption of treated water in cleaning and energy consumption for use of air in aeration, and a method for cleaning a membrane using the same.

Technical Solution

One aspect of the invention relates to a membrane cleaning system. The membrane cleaning system includes: a first membrane filtration tank provided with a membrane and an aerator and filtering inflow raw water by membrane filtration and discharging treated water and water to be treated respectively; a pressure gauge for measuring transmembrane pressure and a flow meter for measuring permeation flux, both of which are disposed on a treated water discharge line of the first membrane filtration tank; and a controller calculating water permeability based on the transmembrane pressure measured by the pressure gauge and the permeation flux measured by the flow meter to calculate a water permeability recovery rate and predicting a degree of membrane contamination based on the calculated water permeability recovery rate and controlling a back-pulsing interval and an intermittent aeration interval.

In one embodiment, the degree of membrane contamination may be found from a cumulative prediction index given by Equation 1:

$$k_n = \frac{1}{\sum_{i=1}^{n} R_i + \frac{K_c}{K_0} - n}$$

where kn denotes a cumulative prediction index immediately after performing back-pulsing (or back-pulsing plus intermittent aeration) n times from the current time point, and K denotes water permeability of the membrane, K0 being initial water permeability before use of the membrane, Kc being water permeability immediately after the latest back-pulsing. Ri denotes a water permeability recovery rate obtained by the $i^{th}$ cleaning after the latest back-pulsing.

A predictive value of Ri for calculating the cumulative prediction index kn may be determined by linear regression of j data (R1' to Rj') accumulated in the past, as given by Equation 2:

$$R_i = \frac{\overline{t_j R'_j} - \overline{t_j} \cdot \overline{R'_j}}{\overline{t_j^2} - \overline{t_j}^2}(t_i - \overline{t_j}) + \overline{R'_j}$$

where ti denotes a time point requiring prediction and is selected from time points immediately after the $i^{th}$ cleaning expected in the future; '-' (bar) denotes arithmetic mean; and Rj' denotes a water permeability recovery rate at the past time point of tj and is defined as in Equation 3 based on the initial water permeability K0:

[Equation 3]

$$R'_j = 1 - \frac{K_{j-1} - K_j}{K_0}$$

(j>1, Kj−1 denotes water permeability immediately after the $j-1^{th}$ cleaning, and Kj denotes water permeability immediately after the $j^{th}$ cleaning).

The first membrane filtration tank may be a submerged membrane filtration tank.

The controller may predict the degree of membrane contamination based on the water permeability recovery rate through simulation. If the degree of membrane contamination is less than a first set value, the controller may maintain a current operating condition, whereas if the degree of membrane contamination is greater than or equal to the first set value, the controller may compare the degree of membrane contamination with a second set value. If the degree of membrane contamination is less than the second set value, the controller may adjust the back-pulsing interval to optimize cleaning conditions, whereas if the degree of membrane contamination is greater than or equal to the second set value, the controller may adjust the aeration interval.

The system may further include a pump for delivering treated water for back-pulsing in a treated water discharge line of the first membrane filtration tank.

An aeration amount by the aerator may be adjusted using a blower based on information received by the controller.

Water to be treated, discharged from the first membrane filtration tank, may be introduced into a second membrane filtration tank, and water to be treated in the second membrane filtration tank may be recovered by being introduced into the first membrane filtration tank as raw water.

Another aspect of the invention relates to a membrane cleaning method. The method includes: measuring transmembrane pressure and permeation flux of treated water from a membrane filtration tank to calculate water permeability; calculating a water permeability recovery rate based on information on the water permeability; predicting a degree of membrane contamination based on the water permeability recovery rate through simulation; if the degree of membrane contamination is less than a first set value, maintaining a current operating condition, whereas if the degree of membrane contamination is greater than or equal to the first set value, comparing the degree of membrane contamination with a second set value; and, if the degree of membrane contamination is less than the second set value, adjusting a back-pulsing interval to optimize cleaning conditions, whereas if the degree of membrane contamination is greater than or equal to the second set value, adjusting an aeration interval.

Advantageous Effects

The present invention provides a membrane cleaning system which can clean a membrane in a more efficient and economical manner by taking into account contamination characteristics of the membrane, can clean the membrane in a timely manner through air cleaning based on a predicted degree of membrane contamination regardless of seasonal variation in quality of raw water, and can automatically adjust an interval of physical cleaning (back-pulsing using treated water and aeration using air), thereby minimizing consumption of treated water and energy consumption for use of air in aeration, and a method for cleaning a membrane using the same.

BEST MODE

Figure 2:
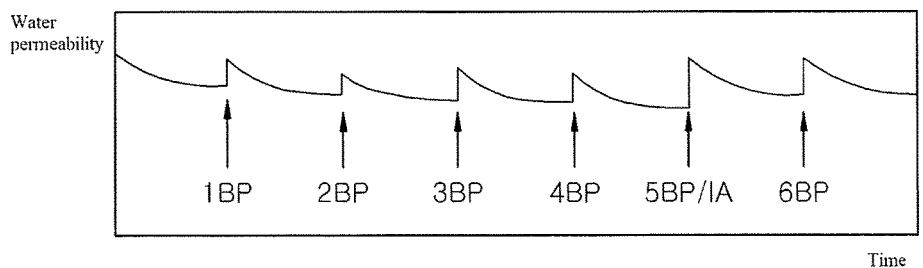
FIG. 2 is a graph showing water permeability over time.

FIG. 2 is a graph showing water permeability over time. In the drawing, BP denotes back-pulsing, and BP/IA denotes performing both back-pulsing and intermittent aeration. As shown therein, in production of water using a membrane, water permeability of the membrane decreases over time and increases again after BP and the like. Here, a degree to which water permeability is recovered with respect to initial water permeability by cleaning such as BP or BP/IA is a water permeability recovery rate (R).

A high recovery rate indicates high cleaning efficiency. Thus, even when water permeability temporarily decreases during production, change of a cleaning method is unnecessary. On the contrary, since a low recovery rate means low cleaning efficiency, even when the water permeability is not greatly reduced at present, the cleaning method needs to be changed over time. In this case, consumption of treated water for back-pulsing or energy consumption for aeration is generally increased. However, the water permeability recovery rate can be temporarily decreased for various reasons. Thus, if back-pulsing or aeration is performed for every temporary decrease in water permeability recovery rate, an excess of treated water or energy is consumed, thereby causing a cost increase.

For example, referring to FIG. 2, it can be seen that a certain degree of water permeability recovery rate was obtained upon 1 BP, whereas the water permeability recovery rate was decreased upon 2 BP. Change of the back-pulsing or aeration method due to temporary decrease in the water permeability recovery rate causes unnecessary costs.

Figure 1:
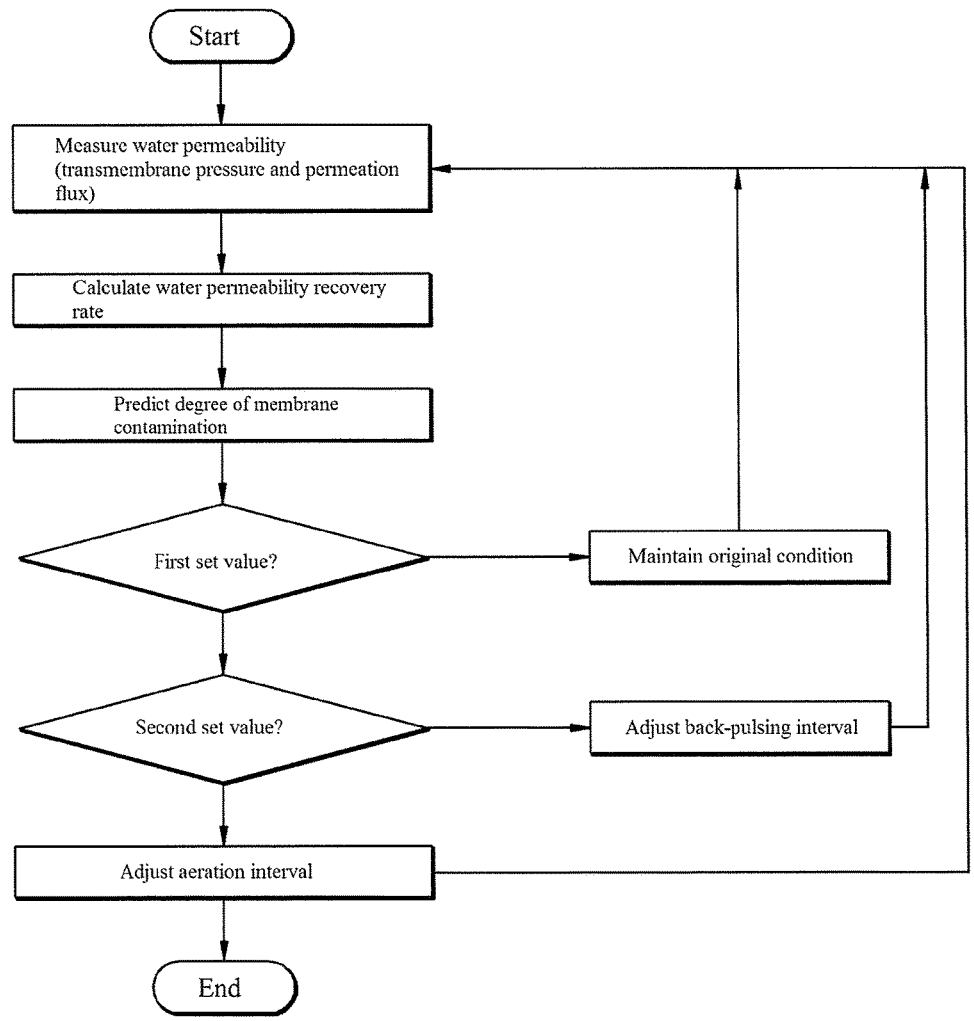
FIG. 1 is a flowchart showing a method of cleaning a membrane according to one embodiment of the present invention.

In the present invention, the water permeability recovery rate is calculated based on measurement of water permeability, followed by predicting a degree of membrane contamination in the future based on the calculated water permeability recovery rate, thereby controlling a back-pulsing interval and an intermittent aeration interval. FIG. 1 is flowchart showing a process of cleaning a membrane according to one embodiment of the present invention.

As shown in the drawing, first, transmembrane pressure and permeation flux are measured of treated water from a membrane filtration tank, thereby measuring water permeability. When the water permeability recovery rate is calculated based on information on the water permeability, it is possible to predict the degree of membrane contamination based on the calculated water permeability recovery rate.

Preferably, the degree of membrane contamination may be found by establishing a database on water permeability recovery rate at each time point rather than at one specific time point and calculating a cumulative prediction index value based on the database. In one embodiment, the contamination degree of the membrane may be found from a cumulative prediction index given by Equation 1:

$$k_n = \frac{1}{\sum_{i=1}^{n} R_i + \frac{K_c}{K_0} - n}$$

where kn denotes a cumulative prediction index immediately after performing back-pulsing (back-pulsing plus intermittent aeration) n times from the current time point, and K denotes water permeability of the membrane, K0 being initial water permeability before use of the membrane, Kc being water permeability immediately after the latest back-pulsing. Ri denotes a water permeability recovery rate obtained by the $i^{th}$ cleaning after the latest back-pulsing.

A predictive value of Ri for calculating the cumulative prediction index kn may be determined by linear regression of j data (R1'~Rj') accumulated in the past, as given by Equation 2:

$$R_i = \frac{\overline{t_j R'_j} - \overline{t_j} \cdot \overline{R'_j}}{\overline{t_j^2} - \overline{t_j}^2}(t_i - \overline{t_j}) + \overline{R'_j}$$

where ti denotes a time point requiring prediction and is selected from time points immediately after the $i^{th}$ cleaning expected in the future; '-' (bar) denotes arithmetic mean; and Rj' denotes a water permeability recovery rate at the past time point of tj and is defined as in Equation 3 based on the initial water permeability K0.

[Equation 3]

$$R'_j = 1 - \frac{K_{j-1} - K_j}{K_0}$$

(j>1, Kj−1 denotes water permeability immediately after the $j-1^{th}$ cleaning, and Kj denotes water permeability immediately after the $j^{th}$ cleaning).

As such, since the degree of membrane contamination is found from the cumulative prediction index, cleaning efficiency and the degree of membrane contamination in the future can be accurately predicted regardless of temporary decease in water permeability recovery rate. In addition, cleaning can be performed in a timely manner, thereby minimizing consumption of treated water and energy consumption for use of air in aeration.

Figure 3:
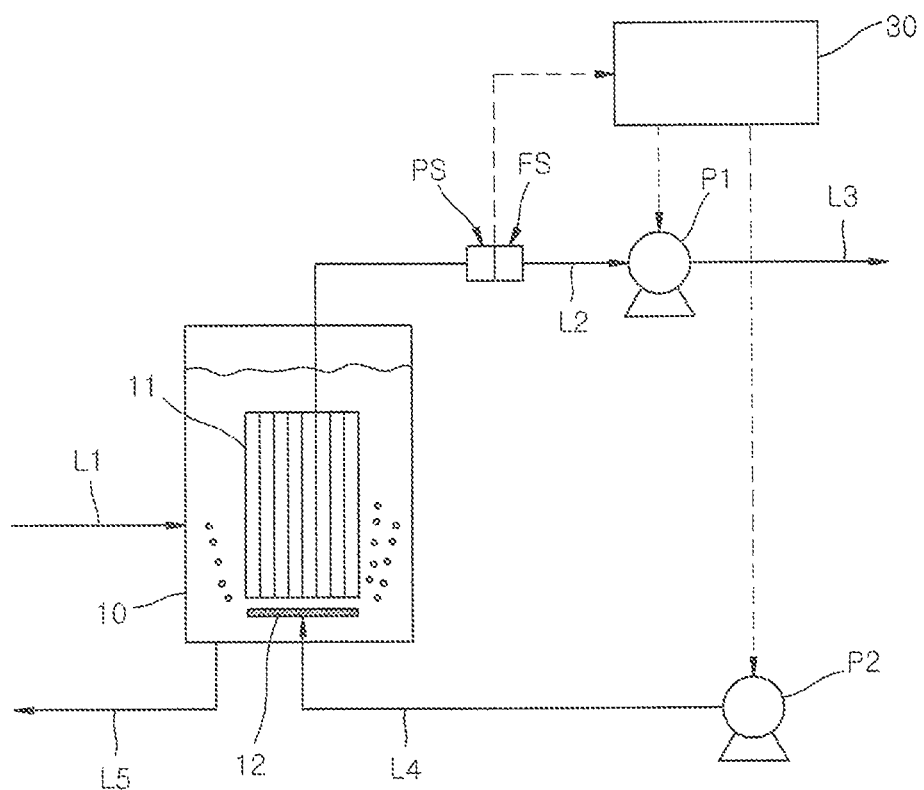
FIG. 3 is a schematic view of a membrane cleaning system according to one embodiment of the present invention.

FIG. 3 is a schematic view of a membrane cleaning system according to one embodiment of the present invention. The membrane cleaning system includes: a first membrane filtration tank 10; a pressure gauge PS for measuring transmembrane pressure and a flow meter FS for measuring permeation flux, both of which are disposed on a treated water discharge line L2; and a controller 30.

The first membrane filtration tank 10 is provided with a membrane 11 and an aerator 12. The membrane 11 may be a submerged membrane wherein a membrane module is submerged and mounted on a tank. In addition, the first membrane filtration tank is further provided with a sensor (not shown) for measuring dissolved oxygen concentration within the membrane filtration tank 10, and information detected by the sensor may also be transmitted to the controller 30. The first membrane filtration tank 10 receives raw water through a line L1. Treated water having been subjected to membrane filtration is discharged through a line L2, whereas water to be treated is discharged through a line L5, or is partially returned. Herein, the water to be treated means inflow water from which treated water has been separated, and includes contaminated water such as slurries.

Aeration amount by the aerator 12 may be adjusted using a blower P2 based on information received by the controller 30, and operation of the blower P2 is controlled by the controller 30.

In addition to the pressure gauge PS and the flow meter FS, a pump P1 is disposed on the line L2, through which treated water is discharged from the membrane filtration tank 10, to suction and drain the treated water.

The controller 30 receives information detected by the pressure gauge PS and the flow meter FS to measure transmembrane pressure and permeation flux, computes water permeability based thereon to calculate water permeability recovery rate, predicts degree of membrane contamination from the calculated water permeability recovery rate, and controls back-pulsing interval and intermittent aeration interval.

In other words, the controller performs simulation using the water permeability recovery rate to predict the degree of membrane contamination. If the predicted degree of membrane contamination is less than a first set value, the controller may maintain current operating conditions, whereas if the predicted degree of membrane contamination is greater than or equal to the first set value, the controller may compare the predicted degree of membrane contamination with a second set value. If the predicted degree of membrane contamination is less than the second set value, the controller may adjust a back-pulsing interval to optimize cleaning conditions, whereas if the predicted degree of membrane contamination is greater than or equal to the second set value, the controller may adjust an aeration interval.

Further, the controller 30 may control the pump P1 to adjust discharge of treated water and back-pulsing. Final treated water is discharged through a line L3.

In another embodiment, the system may further include a pump (not shown) for delivering treated water for back-pulsing in a treated water discharge line of the first membrane filtration tank.

Figure 4:
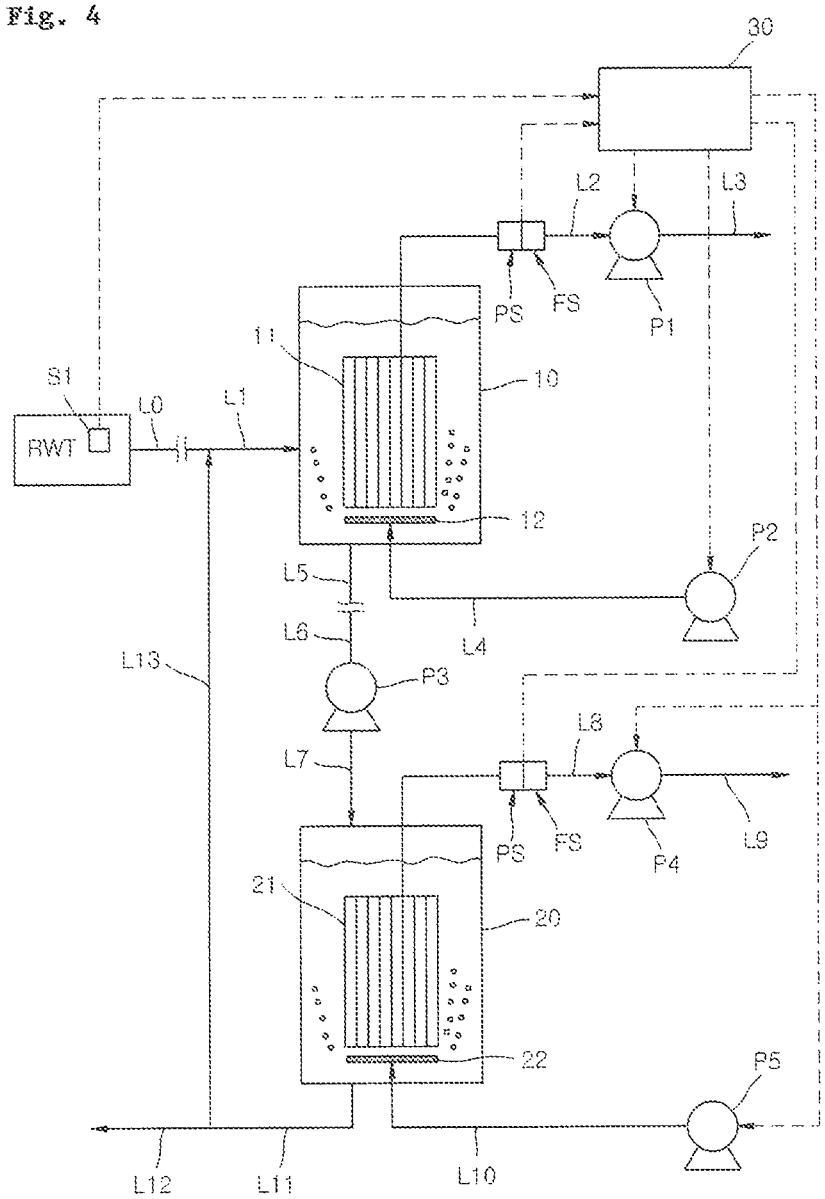
FIG. 4 is a schematic view of a membrane cleaning system according to another embodiment of the present invention.

FIG. 4 is a schematic view of a membrane cleaning system according to another embodiment of the present invention. A raw water tank RWT is provided with a sensor to measure quality and contamination degree of raw water, and information regarding the quality and contamination degree of raw water is sent to a controller 30. Raw water may be directly introduced into a first membrane filtration tank 10 through a line L0, or may be introduced into the first membrane filtration tank 10 through a line L1 after passing through a typical water treatment tank such as a flocculation tank, a sedimentation tank, an anaerobic tank, an anoxic tank, or an aerobic tank.

Water to be treated, discharged from the first membrane filtration tank 10, may be introduced into a separate second membrane filtration tank 20 through lines L5, L6, L7 in a direct manner or via a reservoir tank (not shown). The water to be treated may be introduced into the second membrane filtration tank 20 via a pump P3, as needed. Like the first membrane filtration tank 10, the second membrane filtration tank 20 is also provided with a membrane 21 and an aerator 22.

Aeration amounts by the aerators 11, 12 may be adjusted using blowers P2, P5, respectively, based on information received by the controller 30, and operation of each of the blowers is controlled by the controller 30. In addition to the pressure gauges PS and flow meters FS, pumps P1, P4 are respectively disposed on lines L2, L8, through which treated water is discharged from the membrane filtration tanks 10, 20, respectively, to suction and drain the treated water.

Water to be treated in the second membrane filtration tank 20 may be recovered by joining raw water in the line L1 through a line L13 to be introduced into the first membrane filtration tank 10 as raw water. As such, since water to be treated in the second membrane filtration tank 20 is partially returned to the first membrane filtration tank 10, it is possible to reduce the amount of raw water per the same output and to further improve raw water recovery rate.

Final treated water is discharged through a line L3 and a line L9.

MODE FOR INVENTION

Hereinafter, the present invention will be described in more detail with reference to some examples. However, it should be understood that these examples are provided for illustration only and are not to be in any way construed as limiting the present invention. A description of details apparent to those skilled in the art will be omitted for clarity.

EXAMPLE

Example 1

Testing was conducted using the membrane cleaning system as shown in FIG. 3, which includes a membrane filtration tank; and a pressure gauge and a flow meter disposed on a treated water discharge line. After back-pulsing and aeration were performed at a back-pulsing interval of 15 minutes and an aeration interval of about 5 hours from 0 h to 17.28 h, the back-pulsing interval was changed to 30 minutes at a time point of 17.28 h to perform testing, and the degree of membrane contamination was predicted through a cumulative prediction index. The back-pulsing interval was doubled from 15 minutes to 30 minutes, from 30 minutes to 60 minutes, and so on. Here, the cumulative prediction index was determined based on a value immediately after back-pulsing after a lapse of 12 hours (n=25) from each measurement point, i.e. k25, and testing was performed in accordance with the algorithm in FIG. 1. A first set value was 1.43 (k25<1.43) and a second set value was 2.0 (k25<2.0). 1.43 was a cumulative prediction index wherein the current water permeability was 70% an initial water permeability, and 2.0 was a cumulative prediction index wherein the current water permeability was 50% the initial water permeability. Kc and K0 were measured, followed by calculating k25 by Equation 1. Results are shown in FIG. 1.

TABLE 1

| n | A | Kc | K0 | k25 |
|---|---|---|---|---|
| 25 | 24.886 | 0.886 | 1.00 | 1.30 |

$$\left(\text{where A is } \sum_{i=1}^{25} R_i\right)$$

Figure 5:
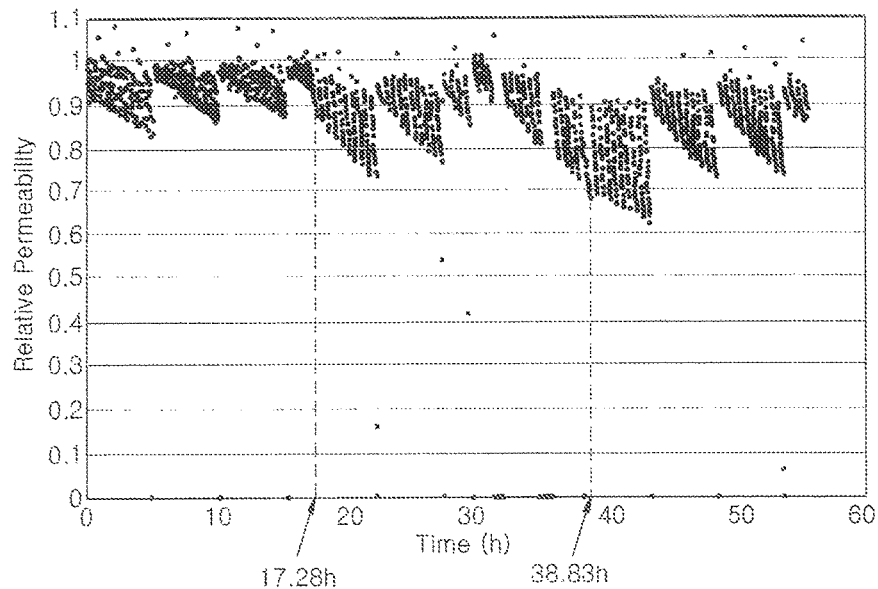
FIG. 5 shows relative water permeability as a function of operating time.

Change in relative permeability (Kc/K0) over time is shown in FIG. 5. As shown in FIG. 5, although an instantaneous relative permeability at a time point of 38.83 h decreased below 70% an initial value, a value of k25 calculated immediately after back-pulsing (at 38.83 h) was 1.30, which is less than 1.43. Thus, original conditions, i.e. a back-pulsing interval of 30 minutes and an aeration interval of about 5 hours were maintained. Despite maintaining the original conditions, operation after the time point of 38.83 h was conducted in a stable manner. From this result, it could be seen that decrease in instantaneous relative permeability was temporary and maintenance of the original conditions based on the cumulative prediction index was successful.

Comparative Example 1

Figure 6:
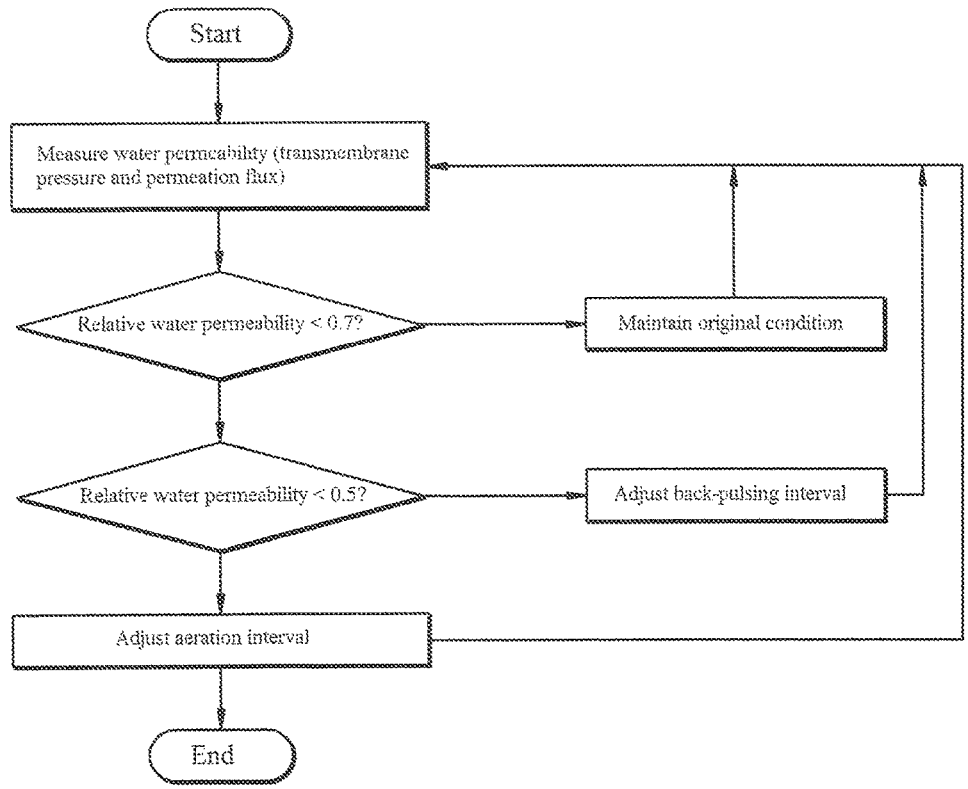
FIG. 6 is a flowchart used in Comparative Example.

An algorithm in FIG. 6 was used. The algorithm was based on an instantaneous relative permeability (Kc/K0) instead of the cumulative prediction index according to the present invention. In FIG. 6, 0.7 was a relative permeability wherein the current water permeability was 70% an initial water permeability, and 0.5 was a relative permeability wherein the current water permeability was 50% the initial water permeability. Since an instantaneous relative permeability at a time point of 38.83 h decreased below 70% an initial value, as in Example 1, the back-pulsing interval was adjusted from 30 minutes to 15 minutes in accordance with the algorithm in Comparative Example 1.

In each of Example 1 and Comparative example 1, the amount of treated water and raw water recovery rate after a time point of 38.83 h were measured, and results are shown in Table 2.

TABLE 2

| After 38.83 h | The amount of treated water for back-pulsing (tons/day) | Raw water recovery rate (%) |
|---|---|---|
| Example 1 | 2.7 m3 | 98 |
| Comparative Example 1 | 5.5 m3 | 95 |

Although the amount of air in the example was the same as that of the comparative example since the aeration interval was not changed in both the example and the comparative example, it can be seen that, since the amount of treated water for back-pulsing in the example was half that of the comparative example, and the raw water recovery rate in the example was higher than that of the comparative example, the example provided better results than the comparative example.

Although some embodiments have been described herein, it should be understood that the present invention is not limited to the above embodiments and may be embodied in various ways, and that various modifications, changes, alterations, and equivalent embodiments can be made by those skilled in the art without departing from the spirit and scope of the present invention. Therefore, it should be understood that these embodiments are provided for illustration only and do not limit the scope of the present invention.

The invention claimed is:

1. A membrane cleaning system comprising:
a first membrane filtration tank provided with a membrane and an aerator and filtering inflow raw water by membrane filtration and discharging treated water and water to be treated respectively;
a pressure gauge configured to measure a transmembrane pressure and a flow meter configured to measure a permeation flux, the pressure gauge and the flow meter being on a treated water discharge line of the first membrane filtration tank;
a pump configured to deliver treated water for back-pulsing to the first membrane filtration tank; and
a controller calculating a water permeability based on the transmembrane pressure measured by the pressure gauge and the permeation flux measured by the flow meter to calculate a water permeability recovery rate and predicting a degree of membrane contamination based on the calculated water permeability recovery rate through simulation and controlling a back-pulsing interval and an intermittent aeration interval based on the predicted degree of membrane contamination,
wherein the degree of membrane contamination is predicted by the controller using a cumulative prediction index given by Equation 1:

$$k_n = \frac{1}{\sum_{i=1}^{n} R_i + \frac{K_c}{K_0} - n}$$

where $k_n$ denotes a cumulative prediction index immediately after performing back-pulsing, or back-pulsing plus intermittent aeration, n times from a current time point; $K0$ denotes an initial water permeability of the membrane before use of the membrane; $Kc$ denotes a water permeability of the membrane immediately after a latest back-pulsing; and $Ri$ denotes a water permeability recovery rate obtained by an $i^{th}$ cleaning after the latest back-pulsing; and
a predictive value of Ri for calculating the cumulative prediction index $k_n$ is determined by a linear regression of j data (R1' to Rj') accumulated in the past, as given by Equation 2:

$$R_i = \frac{\overline{t_j R'_j} - \overline{t_j} \cdot \overline{R'_j}}{\overline{t_j^2} - \overline{t_j}^2}(t_i - \overline{t_j}) + \overline{R'_j}$$

where $t_i$ denotes a time point requiring prediction and is selected from time points immediately after the $i^{th}$ cleaning expected in the future; '-' (bar) denotes arithmetic mean; and Rj' denotes a water permeability recovery rate at the past time point of tj and is defined as in Equation 3 based on the initial water permeability K0:

$$R'_j = 1 - \frac{K_{j-1} - K_j}{K_0} \qquad \text{[Equations 3]}$$

where j>1, $K_{j-1}$ denotes a water permeability of the membrane immediately after a $j-1^{th}$ cleaning, and Kj denotes a water permeability of the membrane immediately after the $j^{th}$ cleaning.

2. The membrane cleaning system according to claim 1, wherein the first membrane filtration tank is a submerged membrane filtration tank.

3. The membrane cleaning system according to claim 1, wherein if the degree of membrane contamination is less than a first set value, the controller maintains a current operating condition, whereas if the degree of membrane contamination is greater than or equal to the first set value, the controller compares the degree of membrane contamination with a second set value; and
if the degree of membrane contamination is less than the second set value, the controller adjusts the back-pulsing interval to optimize cleaning conditions, whereas if the degree of membrane contamination is greater than or equal to the second set value, the controller adjusts the aeration interval.

4. The membrane cleaning system according to claim 1, wherein the pump configured to deliver treated water for back-pulsing is in the treated water discharge line of the first membrane filtration tank.

5. The membrane cleaning system according to claim 1, wherein an aeration amount by the aerator is adjusted using a blower based on information received by the controller.

6. The membrane cleaning system according to claim 1, wherein water to be treated, discharged from the first membrane filtration tank, is introduced into a second membrane filtration tank, and water to be treated in the second membrane filtration tank is recovered by being introduced into the first membrane filtration tank as raw water.

7. A method for cleaning a membrane of a membrane cleaning system including a membrane filtration tank provided with the membrane and an aerator, a pressure gauge and a flow meter on a treated water discharge line of the membrane filtration tank, a pump configured to deliver treated water for back-pulsing to the membrane filtration tank, and a controller, the method comprising:
measuring a transmembrane pressure using the pressure gauge and a permeation flux of treated water from the membrane filtration tank using the flow meter to calculate a water permeability;

calculating a water permeability recovery rate using the controller based on information of the water permeability;

predicting a degree of membrane contamination using the controller based on the water permeability recovery rate through simulation;

if the degree of membrane contamination is less than a first set value, maintaining a current operating condition, whereas if the degree of membrane contamination is greater than or equal to the first set value, comparing the degree of membrane contamination with a second set value; and if the degree of membrane contamination is less than the second set value, adjusting a back-pulsing interval to optimize cleaning conditions, whereas if the degree of membrane contamination is greater than or equal to the second set value, adjusting an aeration interval, wherein the degree of membrane contamination is predicted using a cumulative prediction index given by Equation 1:

$$k_n = \frac{1}{\sum_{i=1}^{n} R_i + \frac{K_c}{K_0} - n}$$

where $k_n$ denotes a cumulative prediction index immediately after performing back-pulsing, or back-pulsing plus intermittent aeration, n times from a current time point; $K0$ denotes an initial water permeability of the membrane before use of the membrane; $Kc$ denotes a water permeability of the membrane immediately after a latest back-pulsing; and $Ri$ denotes a water permeability recovery rate obtained by an $i^{th}$ cleaning after the latest back-pulsing; and a predictive value of $Ri$ for calculating the cumulative prediction index $kn$ is determined by a linear regression of j data ($R1'$ to $Rj'$) accumulated in the past, as given by Equation 2:

$$R_i = \frac{\overline{t_j R'_j} - \overline{t_j} \cdot \overline{R'_j}}{\overline{t_j^2} - \overline{t_j}^2}(t_i - \overline{t_j}) + \overline{R'_j}$$

where $ti$ denotes a time point requiring prediction and is selected from time points immediately after the $i^{th}$ cleaning expected in the future; '-' (bar) denotes arithmetic mean; and $Rj'$ denotes a water permeability recovery rate at the past $tj$ and is defined as in Equation 3 based on the initial water permeability $K0$:

$$R'_j = 1 - \frac{K_{j-1} - K_j}{K_0} \qquad \text{[Equations 3]}$$

where $j>1$, $Kj-1$ denotes a water permeability of the membrane immediately after the $j-1^{th}$ cleaning, and $Kj$ denotes a water permeability of the membrane immediately after the $j^{th}$ cleaning.

* * * * *